No. 783,088.

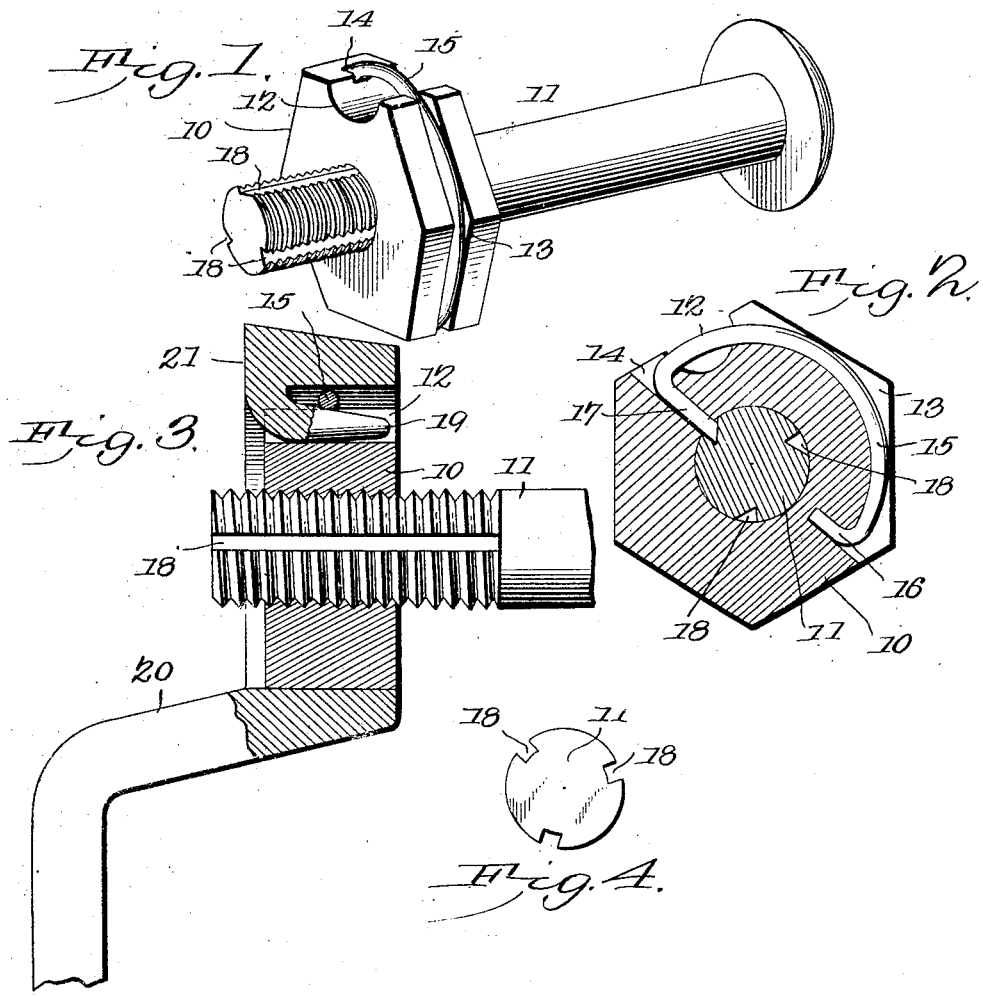

Patented February 21, 1905.

UNITED STATES PATENT OFFICE.

FREDERICK PHILEMON VAUGHAN, OF PERRY, OKLAHOMA TERRITORY.

LOCK-NUT.

SPECIFICATION forming part of Letters Patent No. 783,088, dated February 21, 1905.

Application filed March 5, 1904. Serial No. 196,683.

*To all whom it may concern:*

Be it known that I, FREDERICK PHILEMON VAUGHAN, a citizen of the United States, residing at Perry, in the county of Noble, Oklahoma Territory, have invented a new and useful Lock-Nut, of which the following is a specification.

This invention relates to nuts and bolts having attachments for preventing the nuts rotating backwardly on the bolts, and has for its object to produce an improved device of this character simple in construction, inexpensive to manufacture, easily applied and operated, and which will effectually prevent nuts becoming loosened upon the bolts, but which may at the same time be quickly released when required without injury to the nut or bolt or the locking attachments connected therewith.

With these and other objects in view, which will appear as the nature of the invention is better understood, the same consists in certain novel features of construction, as hereinafter fully described and claimed.

In the accompanying drawings, forming a part of this specifiation, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claim made therefor.

In the drawings thus employed, Figure 1 is a perspective view of a bolt and nut with the improvement applied. Fig. 2 is a transverse section. Fig. 3 is a longitudinal section with the wrench attached in operative position. Fig. 4 is an end view of a modified form of bolt.

The improvements may be applied to any of the various forms and sizes of bolts and nuts manufactured, but for the purpose of illustration is shown applied to an ordinary hexagonal nut 10 and its bolt 11.

The nut is provided with a longitudinal peripheral recess 12, intersecting the front and rear faces of the nut, and also provided with a circumferential channel or groove 13, transsecting the recess, and with an aperture 14 extending inwardly radially of the nut and forming a continuation of the groove at one end. The recess 12 is deeper than the channel or groove 13 for a purpose that will be hereinafter described. Fitting the groove is a spring-rod 15, secured by one end 16 in one end of the groove and with the other end 17 bent for passage through the aperture 14 and extending into the nut-cavity.

The bolt is provided with one or more longitudinal grooves 18 transversely of the threads, with which the terminal of the inwardly-bent end 17 of the rod 15 engages, as shown in Fig. 2. By this means it will be obvious that when a nut thus equipped is connected to the bolt and the portion 17 permitted to spring into the groove the nut will be locked from turning thereon.

If the groove be formed with both sides radially of the bolt, as in Fig. 4, the nut cannot be rotated in either direction; but if one side of the groove be tangential of the bolt, as in Figs. 1 and 2, the nut can be rotated forwardly, but will be held from backward rotation, as will be obvious.

The tangential-sided grooves will generally be employed; but the radially-sided grooves may be employed for some purpose, if required.

A suitably-formed implement will be required to release the rod 15 when the nut is to be rotated, and the function of the recess 12 is to permit the insertion of this implement in the rear of the rod and force the end 17 outward, and preferably this implement will be in the form of an inclined stud 19, extending inwardly from the wrench 20. By this means when the wrench is placed upon the nut the stud 19 will enter the recess 12 and expand the spring-rod and release the nut and hold it released and free to be rotated in the ordinary manner so long as the wrench is in position upon the nut, and when the wrench is removed the stud will be disconnected with it and the spring-rod released to again be engaged with the groove 18.

It will now be understood that the recess 12 is deeper than the groove or channel 13 in order that a space may be preserved beneath the free end portion of the spring 15 for the reception of the stud 19 of the wrench, whereby said stud may readily enter beneath the spring for withdrawing the dog 17 out of the groove of the bolt. Moreover, by having the recess 12 intersecting the front and rear faces of the nut there is nothing to obstruct the passage of the stud 19 through the recess, and it matters not which face is the outer face of the nut, as the stud 19 may enter either open end of the recess.

If the tangentially-sided grooves be employed, the nut can be applied by any form of wrench, the end 17 simply clicking over the grooves as it passes over them, but can be released only by inserting an implement, such as the stud 19, in the recess 12 in the rear of the rod. The wrench 20, having the stud 19 attached, is therefore a very useful and convenient adjunct to the improved device and materially facilitates the operation.

The grooves 18, channel 13, aperture 14, and recess 12 may all be cheaply and quickly formed by suitable machinery and at a trifling expense, so that the additional expense for nuts and bolts of this character over those of ordinary construction is relatively small, especially when its great advantages are considered.

The improved device can be applied to all sizes and forms of nuts and bolts, to those employed for various purposes, and can be applied with equal facility to nuts and bolts already manufactured or to the same in the course of manufacture.

Having thus described the invention, what is claimed is—

A nut having an outer marginal groove located between the front and rear faces thereof and terminating at one end in a substantially radial socket having a closed inner end and at its opposite end in a substantially radial opening intersecting the bolt-opening of the nut with a transverse recess intersecting the groove adjacent the radial opening and also intersecting the front and rear faces of the nut, and a bowed spring seated in the groove with one end bent inwardly and secured within the socket and its opposite end bent inwardly to form a dog working in the radial opening, the transverse recess being deeper than the groove to form an open-ended passage beneath the spring for the reception of a releasing device inserted from either end of the recess.

In testimony that I claim the foregoing as my own I have hereto affixed my signature in the presence of two witnesses.

FREDERICK PHILEMON VAUGHAN.

Witnesses:
   NEWTON L. FALLS,
   H. A. JOHNSON.